US012573573B2

(12) United States Patent
Hilker et al.

(10) Patent No.: US 12,573,573 B2
(45) Date of Patent: Mar. 10, 2026

(54) TRIPPING DEVICE FOR A CIRCUIT BREAKER

(71) Applicant: Siemens Energy Global GmbH & Co. KG, Munich (DE)

(72) Inventors: Thomas Hilker, Stahnsdorf (DE); Gunnar Lutzke, Berlin (DE); Rudolf Groth, Glienicke (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 291 days.

(21) Appl. No.: 18/256,958

(22) PCT Filed: Nov. 30, 2021

(86) PCT No.: PCT/EP2021/083480
§ 371 (c)(1),
(2) Date: Jun. 12, 2023

(87) PCT Pub. No.: WO2022/122464
PCT Pub. Date: Jun. 16, 2022

(65) Prior Publication Data
US 2024/0047162 A1 Feb. 8, 2024

(30) Foreign Application Priority Data
Dec. 11, 2020 (DE) ..................... 10 2020 215 711.1

(51) Int. Cl.
*H01H 71/44* (2006.01)
*H01H 71/24* (2006.01)

(52) U.S. Cl.
CPC ........ *H01H 71/44* (2013.01); *H01H 71/2454* (2013.01)

(58) Field of Classification Search
CPC ....... H01F 7/18; H01H 71/2454; H01H 71/44
USPC .......................................................... 361/195
See application file for complete search history.

(56) References Cited

U.S. PATENT DOCUMENTS 1,287,232 A * 12/1918 Chubb ..................... H01H 9/56 361/5
1,695,885 A * 12/1928 Crichton ................ H01H 71/44 361/94
2,965,810 A * 12/1960 Claybourn ............. H02H 3/083 361/64

FOREIGN PATENT DOCUMENTS

CN 206727049 U 12/2017
DE 102005047042 A1 4/2007
DE 102019128338 A1 4/2021
JP H07226133 A * 8/1995

OTHER PUBLICATIONS

Machine translation of Kano et al. Japanese Patent Document JP H07-226133 A Aug. 1995 (Year: 1995).*

* cited by examiner

*Primary Examiner* — Kevin J Comber
(74) *Attorney, Agent, or Firm* — Laurence A. Greenberg; Werner H. Stemer; Ralph E. Locher

(57) ABSTRACT

A trip device for a power circuit breaker has a trip element, a trip circuit with a trip coil, which, when energized, is configured to effect a movement of the trip element, and at least one electrical delay element, which can be connected to the trip circuit and reduces the rate of a rise in a current flowing in the trip coil once the trip circuit has been closed and/or delays a rise in a current flowing in the trip coil once the trip circuit has been closed.

10 Claims, 5 Drawing Sheets

TRIPPING DEVICE FOR A CIRCUIT BREAKER

FIELD AND BACKGROUND OF THE INVENTION

The invention relates to a tripping device for a circuit breaker, comprising a tripping element and a tripping coil that is designed, upon being energized, to effect a movement of the tripping element. The invention also relates to a circuit breaker comprising such a tripping device and a method for increasing a tripping time of a tripping device for a circuit breaker that has a tripping element and a tripping coil that is designed, upon being energized, to effect a movement of the tripping element.

The tripping device is designed to trigger a switching process of the circuit breaker. A current flowing in the tripping coil generates a magnetic field that effects the movement of the tripping element. For this purpose, the tripping element has a ferromagnetic magnet armature, for example. By way of example, the tripping element moved by the magnetic field releases a switch drive that then drives at least one switching contact element of the circuit breaker.

For a circuit breaker, there are specific requirements for the time interval between the start of the flow of current in the tripping circuit and the closing or opening of the circuit breaker contacts. This time interval is referred to as the switch response time. The time interval between the start of the flow of current in the tripping circuit and the end of a movement stroke of the tripping element is referred to as the tripping time. The tripping time therefore constitutes a first part of the switch response time. In the remaining part of the switch response time, the actual switching process is executed by moving the at least one switching contact element. By way of example, the requirements made of the switch response time can, for a circuit breaker having a common drive for a plurality of breaker poles, result from the requirements of the electrical switching capacity, or else, for a circuit breaker having one or else a plurality of drives for a respective individual breaker pole, result from the requirement that all the breaker poles of the circuit breaker have to open or close in a particular time interval or else the interrupter units of an individual breaker pole that are actuated by different drives have to open or close in a particular time interval.

It is often a requirement that the switch response time is as short as possible so that the current flow of an AC current in the circuit breaker can be interrupted quickly, for example within two current cycles of the AC current. In addition, it can be a requirement, for example, that the power consumption of the tripping device is limited, with the result that the tripping device cannot simply be made faster through a corresponding configuration. The power consumption of the tripping device has to have a particular minimum value, however, so that the force exerted on the tripping element is sufficient to release the switch drive, in particular even in the case of an undervoltage of the voltage supply of the tripping device. The power consumption of the tripping device can therefore also not be reduced arbitrarily. Furthermore, in general, the actual switching speed, that is to say the speed of the moving switching contact elements, may not be changed, since this switching speed has an influence on the electrical switching capacity.

In the case of a circuit breaker having a dedicated drive for each breaker pole or a plurality of drives per breaker pole, the opening and/or closing times of the breaker poles or the interrupter units of the individual breaker poles additionally have to be in a particular time window, that is to say that these times have to be synchronized. To this end, by way of example, the drives of the breaker poles or interrupter units can be changed without changing the actual switching speed by virtue of the tripping time, and therefore the switch response time, for the slowest or quickest breaker pole being changed.

Reducing the switch response time by reducing the tripping time for the slowest breaker pole by way of greater power consumption is often not possible on account of a required limited power consumption and/or the tripping systems are exhausted in respect of achievable short tripping times, meaning that a further reduction for the synchronization within the requirements is not possible. In such a case, it may be necessary to delay the switching of the quickest breaker pole. It should be possible to implement this delay on a constructed circuit breaker in a manner that is as simple and as finely settable as possible, since this setting process has to be performed during routine testing following production of the circuit breaker.

For a circuit breaker having a common drive for a plurality of breaker poles, the switch response time should be increased by a particular relatively large time interval up to approximately 20 ms, for example. In contrast, for synchronization in the case of a circuit breaker having single pole drives, a switch response time should be made settable by a relatively small time interval of a few ms, for example, without in the process changing the actual switching speed after the start of movement. Furthermore, both the tripping process and the synchronization in the case of a circuit breaker having single pole drives still have to function even if the voltage supply of the tripping devices changes within required limit values.

In order to delay the switching of a breaker pole, it is therefore appropriate to increase the tripping time of the associated tripping device. By way of example, an additional mass, which has to be concomitantly moved upon tripping, or a spring, which counters the movement of the tripping element upon tripping, can be arranged on the tripping element in order to increase the tripping time. However, in the case of an undervoltage of the voltage supply of the tripping device, the tripping process can be impeded or completely prevented by such a component. Furthermore, the synchronization of the tripping of a plurality of drives that is achieved in the case of a rated voltage of the voltage supply of the tripping devices by way of such components can be negatively influenced by these components in the case of an undervoltage or an overvoltage of the voltage supply of the tripping devices, with the result that the synchronization is possibly even worsened in comparison with an operation without these components.

SUMMARY OF THE INVENTION

The invention is based on the object of, using simple means, increasing a tripping time of a tripping device for a circuit breaker that has a tripping element and a tripping coil that, upon being energized, effects a movement of the tripping element.

The object is achieved according to the invention by a tripping device having the features of the independent tripping device claim, a circuit breaker having the features of the independent circuit breaker claim and a method having the features of the independent method claim.

Advantageous configurations of the invention are the subject of the dependent claims.

A tripping device, according to the invention, for a circuit breaker comprises a tripping element, a tripping circuit comprising a tripping coil that is designed, upon being energized, to effect a movement of the tripping element, and at least one electrical delay element that is able to be connected to the tripping circuit and reduces a steepness of a current increase of a current flowing in the tripping coil after the tripping circuit has been closed and/or delays a current increase of a current flowing in the tripping coil after the tripping circuit has been closed. In this case, the movement of the tripping element is caused by a magnetic field that is generated by a current flowing in the tripping coil. By way of example, the tripping element has a ferromagnetic magnet armature.

In this case, the steepness of the current increase of the current flowing in the tripping coil after the tripping circuit has been closed is understood to mean the gradient of the current flowing in the tripping coil as a function of time or the first time derivative of the current flowing in the tripping coil in a time interval immediately following the closing of the tripping circuit. According to the invention, an electrical delay element is able to be connected to the tripping circuit of the tripping device, which delay element reduces this steepness and/or delays a current increase of a current flowing in the tripping coil after the tripping circuit has been closed. As a result, the increase of the magnetic field generated by the tripping coil is delayed and the acceleration of the tripping element moved by this magnetic field is reduced and/or delayed in the time interval after the tripping circuit has been closed in comparison with the case in which the at least one electrical delay element is not connected into the tripping circuit. Reducing and/or delaying the acceleration of the tripping element immediately after the tripping circuit has been closed increases the tripping time of the tripping device. The tripping device according to the invention therefore makes it possible to increase the tripping time by connecting at least one electrical delay element into the tripping circuit.

The at least one electrical delay element is preferably also designed and connected in such a way that it only appreciably influences the current flowing in the tripping coil in a switch-on phase immediately after the tripping circuit has been closed, whereas it has a negligible effect on this current later on. As a result, the at least one electrical delay element merely increases the tripping time of the tripping device, but does not appreciably reduce either the force acting on the tripping element after the switch-on phase or the movement stroke of the tripping element in comparison with the case in which the at least one electrical delay element is not connected into the tripping circuit.

In other words, connecting in the at least one electrical delay element does not adversely affect the functionality of the tripping device, but merely increases the tripping time thereof.

In one configuration of the tripping device according to the invention, a delay element is a delay coil that is able to be connected in series with the tripping coil. If the delay coil is connected into the tripping circuit, the inductive resistance of the delay coil is effective in a time interval in which the current in the tripping circuit increases immediately after the tripping circuit has been closed, whereas the inductive resistance of the delay coil hardly plays a role later on if the current intensity in the tripping circuit no longer changes to a great extent. The inductive resistance of the delay coil therefore reduces the current flowing in the tripping coil immediately after the tripping circuit has been closed and thereby increases the tripping time of the tripping device in comparison with the case in which the delay coil is not connected into the tripping circuit. If the delay coil has a considerably lower ohmic resistance than the tripping coil, after the switch-on phase, the delay coil also influences the current intensity in the tripping circuit only slightly in comparison with the case in which the delay coil is not connected in, and therefore essentially merely causes the tripping time of the tripping device to be increased.

In a further configuration of the tripping device according to the invention, the tripping device has a magnetic core, around which a winding of the delay coil runs. The inductance of the delay coil can advantageously be increased by way of the magnetic core.

In a further configuration of the tripping device according to the invention, the magnetic core is arranged so as to be displaceable with respect to the delay coil, with the result that an inductance of the delay coil is able to be changed.

The ability of the inductance of the delay coil to be changed also means that the increase in the tripping time of the tripping device is able to be changed, and is therefore able to be set within specific limits in a flexible and continuous manner, in comparison with the case in which the delay coil is not connected to the tripping circuit.

In a further configuration of the tripping device according to the invention, a number of turns of the delay coil, in which turns electric current flows when the tripping circuit is closed, is settable. By way of example, the delay coil has a plurality of taps or an adjustable tap in order to set the number of turns. The ability of the number of turns of the delay coil, through which turns current flows, to be changed also means that the inductive resistance of the delay coil, and therefore the increase in the tripping time of the tripping device, are settable in comparison with the case in which the delay coil is not connected to the tripping circuit.

In a further configuration of the tripping device according to the invention, a delay element is an electrical resistor that is able to be connected in series with the tripping coil and the delay coil, in particular an electrical resistor having a settable ohmic resistance. By way of an electrical resistor that is connected in series with the tripping coil and the delay coil, the current in the tripping coil is reduced, and therefore the tripping time of the tripping device is increased, in comparison with the case in which the electrical resistor is not connected into the tripping circuit. An electrical resistor having a settable ohmic resistance allows a settable increase in the tripping time.

In a further configuration of the tripping device according to the invention, a delay element is a capacitor that is able to be connected in parallel with the tripping coil. If the capacitor is connected in parallel with the tripping coil, an electric current that charges the capacitor flows into the capacitor in a time interval directly after the tripping circuit has been closed. As a result, the current flowing in the tripping coil is reduced in comparison with the case in which the capacitor is not connected into the tripping circuit, and therefore the tripping time of the tripping device is conversely increased. When the capacitor is charged, the DC resistance of the capacitor is practically infinite and the current in the tripping circuit flows practically exclusively in the current path with the tripping coil, with the result that the tripping coil generates the same magnetic field and therefore effects the same force on the tripping element as in the case in which the capacitor is not connected into the tripping circuit. Therefore, connecting in the capacitor increases the tripping time of the tripping device, but hardly changes the force on the tripping element caused by the magnetic field generated by the tripping coil in comparison with the case in which the capacitor is not connected to the tripping circuit.

In a further configuration of the tripping device according to the invention, a delay element is a capacitor and a further delay element is an electrical resistor, wherein a series connection of the capacitor and the electrical resistor is able to be connected in parallel with the tripping coil. By way of example, the electrical resistor has a settable ohmic resistance. In comparison with the above-mentioned configuration, in this configuration of the tripping device according to the invention, instead of just a capacitor, a series connection of a capacitor and an electrical resistor is able to be connected in parallel with the tripping coil. The electrical resistor increases the charging duration for charging the capacitor after the tripping circuit has been closed, and therefore the tripping time of the tripping device, in comparison with the case in which just the capacitor is connected in parallel with the tripping coil. The charging time for charging the capacitor after the tripping circuit has been closed, and therefore the increase in the tripping time of the tripping device, are furthermore advantageously settable by way of an electrical resistor having a settable ohmic resistance.

In one development of the above-mentioned configurations of the tripping device according to the invention, the capacitor has a settable capacitance. The capacitive resistance of the capacitor, and therefore in turn the increase in the tripping time of the tripping device as a result of connecting the capacitor into the tripping circuit, are advantageously settable due to the ability of the capacitance of the capacitor to be set.

In one further configuration of the tripping device according to the invention, the tripping coil and at least one delay element are arranged in a common housing. Arranging a delay element in the same housing as the tripping coil allows a space-saving and compact embodiment of the delay device.

A circuit breaker according to the invention has a tripping device according to the invention that is designed to trigger a switching process of the circuit breaker. In the case of a circuit breaker, according to the invention, having a plurality of separately driven breaker poles, the opening or closing times of the breaker poles can be advantageously synchronized by increasing the switch response time of at least one breaker pole by using a tripping device according to the invention for driving this breaker pole, the tripping time of said tripping device being increased by connecting in at least one delay element.

The method according to the invention is used to increase a tripping time of a tripping device for a circuit breaker that has a tripping element and a tripping circuit comprising a tripping coil that is designed, upon being energized, to effect a movement of the tripping element. In the method, at least one electrical delay element is connected to the tripping circuit and reduces a steepness of a current increase of a current flowing in the tripping coil after the tripping circuit has been closed and/or delays a current increase of a current flowing in the tripping coil after the tripping circuit has been closed.

The above-described properties, features and advantages of this invention, and the manner in which they are achieved, become clearer and more distinctly comprehensible in connection with the following description of exemplary embodiments that are explained in more detail in connection with the drawings, in which:

DETAILED DESCRIPTION OF THE INVENTION

In the figures, parts corresponding to one another have been provided with the same reference signs.

Figure 1:
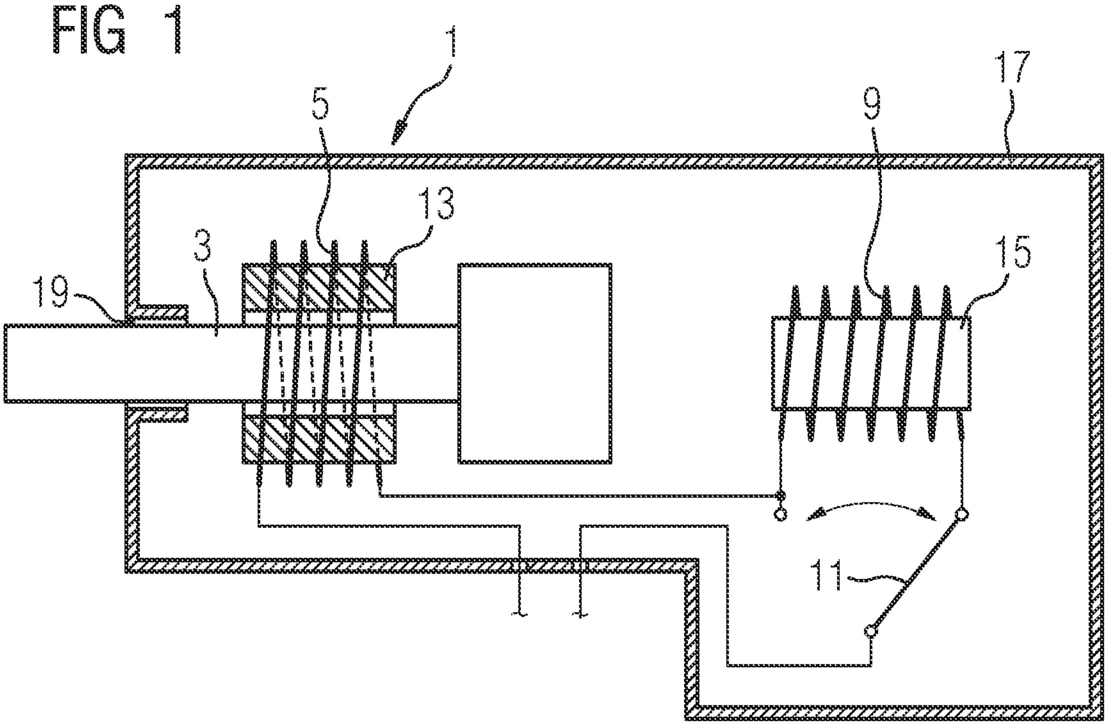
FIG. 1 shows a schematic illustration of a first exemplary embodiment of a tripping device.
Figure 2:
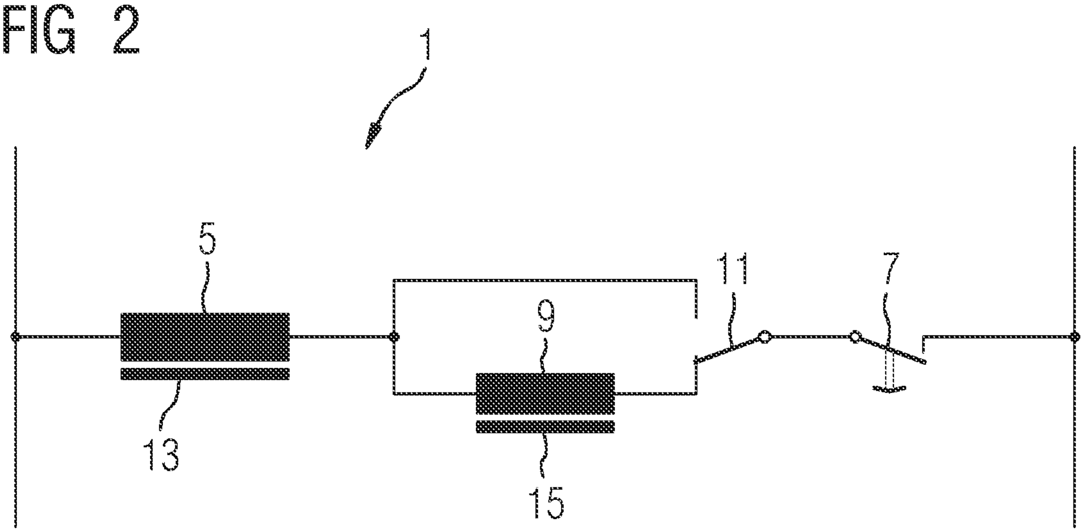
FIG. 2 shows a circuit diagram of the tripping device shown in FIG. 1.

FIGS. 1 and 2 (FIG. 1 and FIG. 2) show a first exemplary embodiment of a tripping device 1, according to the invention, for a circuit breaker. FIG. 1 shows a schematic illustration of the tripping device 1, FIG. 2 shows a circuit diagram of the tripping device 1.

The tripping device 1 comprises a tripping element 3 and a tripping circuit comprising a tripping coil 5 that is designed, upon being energized, to effect a movement of the tripping element 3, and a switching element 7, using which the tripping circuit can be opened and closed (the switching element 7 is not illustrated in FIG. 1). The tripping device 1 also comprises a delay coil 9 that is able to be connected to the tripping circuit by way of a changeover switch 11. FIG. 1 shows a first switching position of the changeover switch 11 in which the changeover switch 11 connects the delay coil 9 in series with the tripping coil 5. In a second switching position, the changeover switch 11 bypasses the delay coil 9, and so the delay coil 9 is not in the current path of the tripping circuit.

A winding of the tripping coil 5 runs around a first magnetic core 13. The first magnetic core 13 annularly surrounds a section of the tripping element 3. The tripping element 3 has a ferromagnetic magnet armature. If the tripping circuit is closed by the switching element 7, an electric current flowing in the tripping coil 5 generates a magnetic field, by way of which the tripping element 3 is moved. The tripping element 3 moved by the magnetic field releases a switch drive that drives at least one switching contact element of the circuit breaker after being released. By way of example, for this purpose, the tripping element 3 releases a latching element that inhibits a movement of the at least one switching contact element.

The delay coil 9 has an ohmic resistance that is, for example, considerably lower than an ohmic resistance of the tripping coil 5 if the total power in the tripping circuit is intended to be as low as possible. A winding of the delay coil 9 runs around a second magnetic core 15.

If the delay coil 9 is connected into the tripping circuit by way of the changeover switch 11, in a time interval in which the current in the tripping circuit increases immediately after the tripping circuit has been closed, the inductive resistance of the delay coil 9 reduces a steepness of a current increase of a current flowing in the tripping coil 5 in comparison with the case in which the delay coil 9 is bypassed by the changeover switch 11. If the current in the tripping circuit stabilizes after a switch-on phase, the delay coil 9 influences the current intensity in the tripping circuit only slightly in comparison with the case in which the delay coil 9 is not connected in, provided that the ohmic resistance of the delay coil 9 is considerably lower than the ohmic resistance of the tripping coil 5 because the inductive resistance of the delay coil 9 only has a significant effect if the current intensity in the tripping circuit changes. Therefore, connecting in the delay coil 9 increases the tripping time of the tripping device 1, but hardly changes the force on the tripping element 3 caused by the magnetic field generated by the tripping coil 5 in comparison with the case in which the delay coil 9 is not connected to the tripping circuit.

The tripping coil 5, the delay coil 9, the magnetic cores 13, 15 and the tripping element 3 are arranged in a common housing 17, wherein an end section of the tripping element 3 protrudes from the housing 17 through a housing opening 19.

Figure 3:
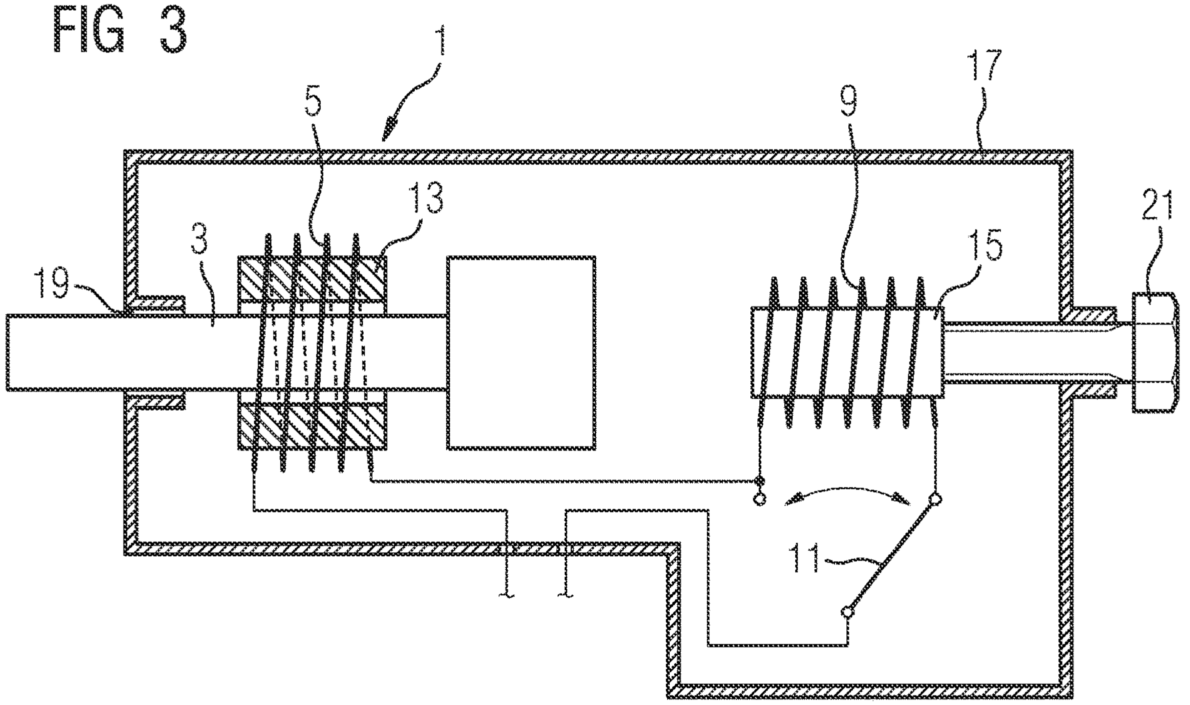
FIG. 3 shows a schematic illustration of a second exemplary embodiment of a tripping device.

FIG. 3 (FIG. 3) shows a schematic illustration of a second exemplary embodiment of a tripping device 1, according to the invention, for a circuit breaker. This exemplary embodiment only differs from the exemplary embodiment shown in FIGS. and 2 in that the second magnetic core 15 is arranged so as to be displaceable with respect to the delay coil 9, with the result that an inductance of the delay coil 9 is able to be changed. In the exemplary embodiment shown in FIG. 3, the second magnetic core 15 is displaceable by way of an adjusting screw 21 that is connected to the second magnetic core 15, is guided on the housing 17 and protrudes from the housing 17. The ability of the second magnetic core 15 to be displaced means that the inductive resistance of the delay coil 9, and therefore the increase in the tripping time of the tripping device 1, are settable in comparison with the case in which the delay coil 9 is not connected to the tripping circuit.

Figure 4:
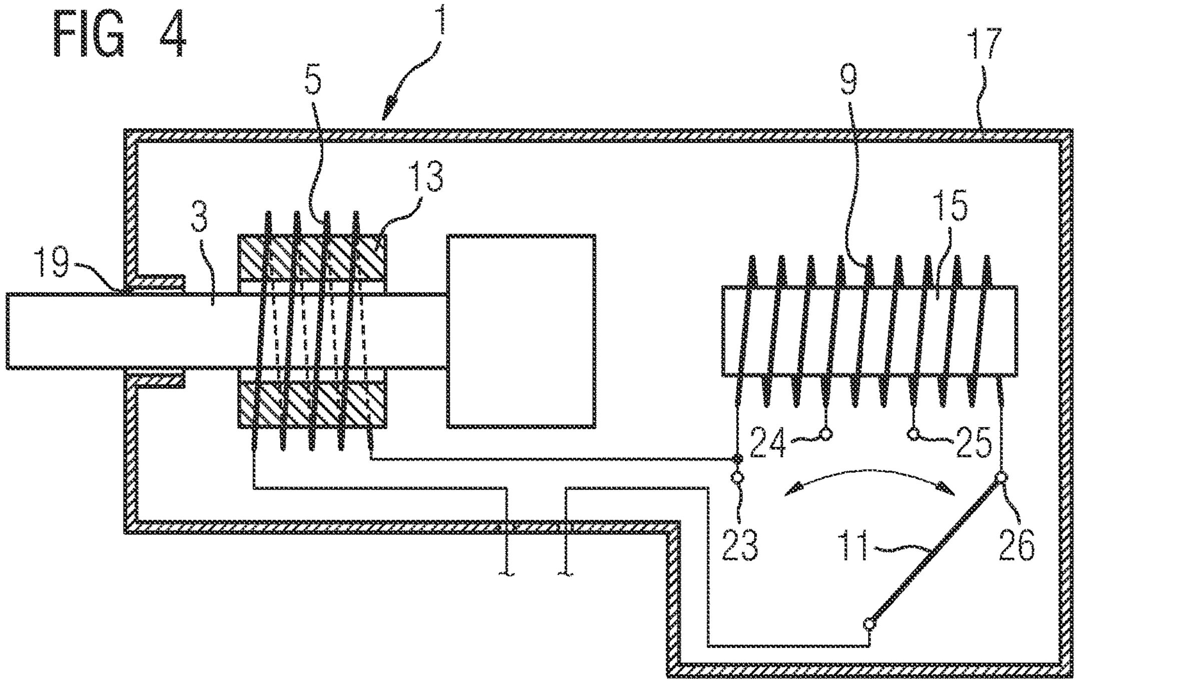
FIG. 4 shows a schematic illustration of a third exemplary embodiment of a tripping device.

FIG. 4 (FIG. 4) shows a schematic illustration of a third exemplary embodiment of a tripping device 1, according to the invention, for a circuit breaker. This exemplary embodiment only differs from the exemplary embodiment shown in FIGS. 1 and 2 in that the delay coil 9 has a plurality of taps 23 to 26 that are optionally contactable by way of a changeover switch 11. If the changeover switch 11 makes contact with a first tap 23 of the delay coil 9, the delay coil 9 is bypassed, and so said delay coil is not in the current path of the tripping circuit. If the changeover switch 11 makes contact with one of the other taps 24 to 26, a different number of turns of the delay coil 9, in which turns electric current flows when the tripping circuit is closed, is set in each case. In other words, a number of turns of the delay coil 9, in which turns electric current flows when the tripping circuit is closed, is settable by way of the changeover switch 11. By changing this number of turns, an inductance of the delay coil 9, and therefore the increase in the tripping time of the tripping device 1, are able to be changed and able to be set in comparison with the case in which the delay coil 9 is not connected to the tripping circuit.

Figure 5:
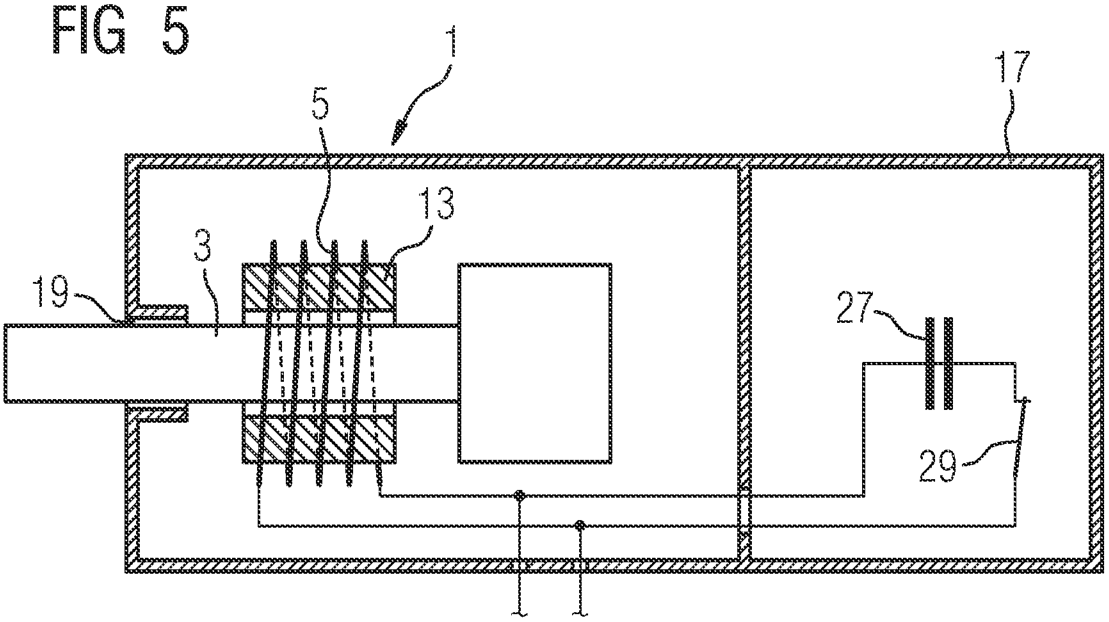
FIG. 5 shows a schematic illustration of a fourth exemplary embodiment of a tripping device.
Figure 6:
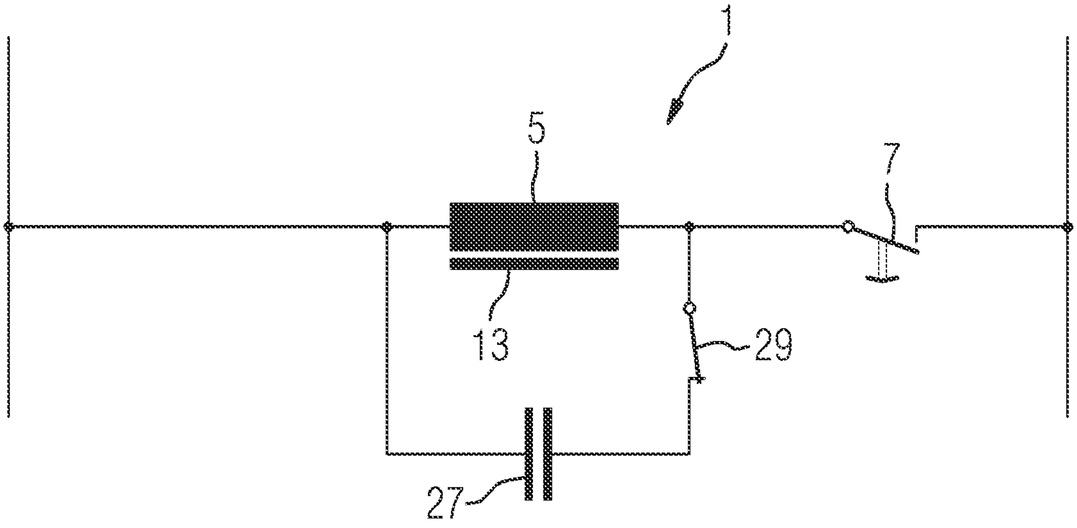
FIG. 6 shows a circuit diagram of the tripping device shown in FIG. 5.

FIGS. 5 and 6 (FIG. 5 and FIG. 6) show a fourth exemplary embodiment of a tripping device 1, according to the invention, for a circuit breaker. FIG. 5 shows a schematic illustration of the tripping device 1, FIG. 6 shows a circuit diagram of the tripping device 1.

The tripping device 1, like the exemplary embodiments shown in FIGS. 1 to 4, comprises a tripping element 3, a magnetic core 13 that annularly surrounds a section of the tripping element 3, a tripping circuit comprising a tripping coil 5 that has a winding running around the magnetic core 13 and is designed, upon being energized, to effect a movement of the tripping element 3, and a switching element 7, using which the tripping circuit can be opened and closed (the switching element 7 is not illustrated in FIG. 5). The tripping device 1 also comprises a capacitor 27 that is able to be connected to the tripping circuit in parallel with the tripping coil 5 by way of a switch 29.

If the capacitor 27 is connected in parallel with the tripping coil 5, an electric current that charges the capacitor 27 flows into the capacitor 27 in a time interval immediately after the tripping circuit has been closed. As a result, the current flowing in the tripping coil 5 is reduced in comparison with the case in which the capacitor 27 is not connected into the tripping circuit, and therefore the tripping time of the tripping device 1 is conversely increased. When the capacitor 27 is charged, the DC resistance of the capacitor 27 is practically infinite and the current in the tripping circuit flows practically exclusively in the current path with the tripping coil 5, with the result that the tripping coil 5 generates the same magnetic field and therefore effects the same force on the tripping element 3 as in the case in which the capacitor 27 is not connected into the tripping circuit. Therefore, connecting in the capacitor 27 increases the tripping time of the tripping device 1, but hardly changes the force on the tripping element 3 caused by the magnetic field generated by the tripping coil 5 in comparison with the case in which the capacitor 27 is not connected to the tripping circuit.

Figure 7:
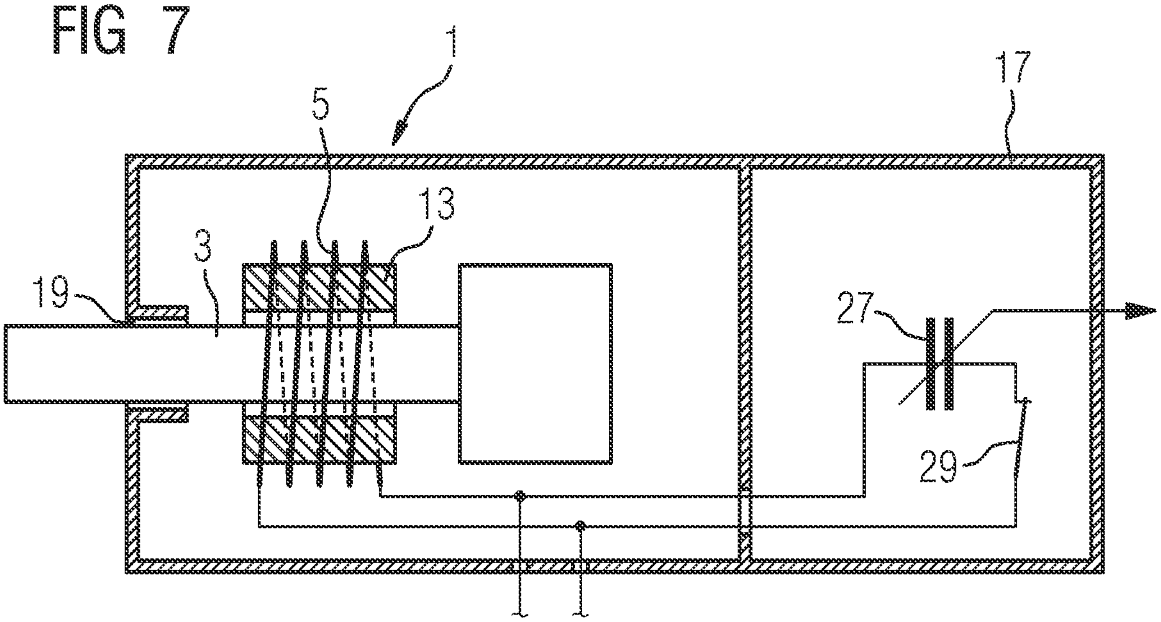
FIG. 7 shows a schematic illustration of a fifth exemplary embodiment of a tripping device.

FIG. 7 (FIG. 7) shows a schematic illustration of a fifth exemplary embodiment of a tripping device 1, according to the invention, for a circuit breaker. This exemplary embodiment only differs from the exemplary embodiment shown in FIGS. and 6 in that the capacitor 27 has a settable capacitance. The capacitive resistance of the capacitor 27, and therefore the increase in the tripping time of the tripping device 1, are settable in comparison with the case in which the capacitor 27 is not connected to the tripping circuit, due to the ability of the capacitance of the capacitor 27 to be set.

Figure 8:
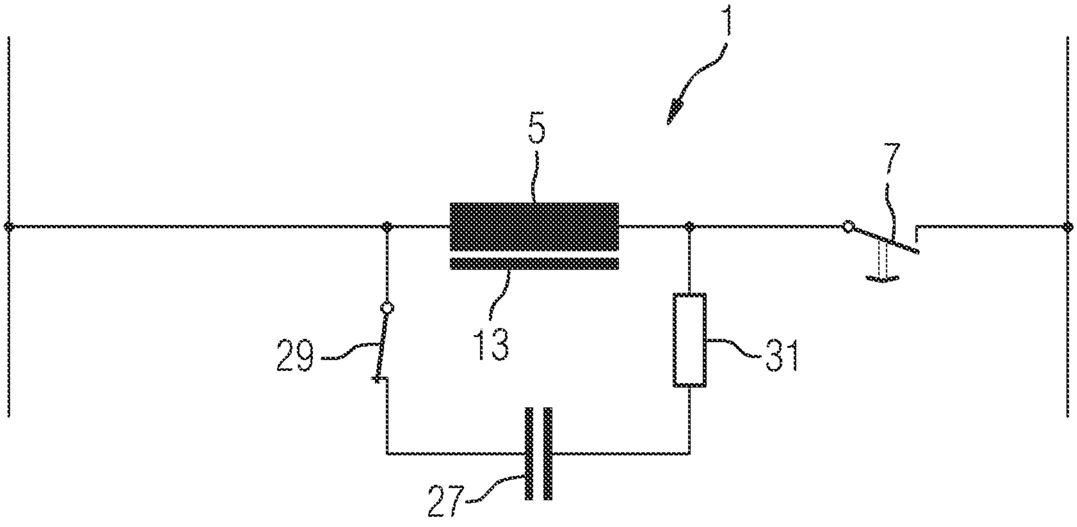
FIG. 8 shows a circuit diagram of a sixth exemplary embodiment of a tripping device.

FIG. 8 (FIG. 8) shows a circuit diagram of a sixth exemplary embodiment of a tripping device 1, according to the invention, for a circuit breaker. This exemplary embodiment only differs from the exemplary embodiment shown in FIGS. 5 and 6 in that, instead of just the capacitor 27, a series connection of a capacitor 27 and an electrical resistor 31 is able to be connected in parallel with the tripping coil 5 by way of the switch 29. The electrical resistor 31 increases the charging duration for charging the capacitor 27 after the tripping circuit has been closed, and therefore the tripping time of the tripping device 1, in comparison with the case in which just the capacitor 27 is connected in parallel with the tripping coil 5.

Figure 9:
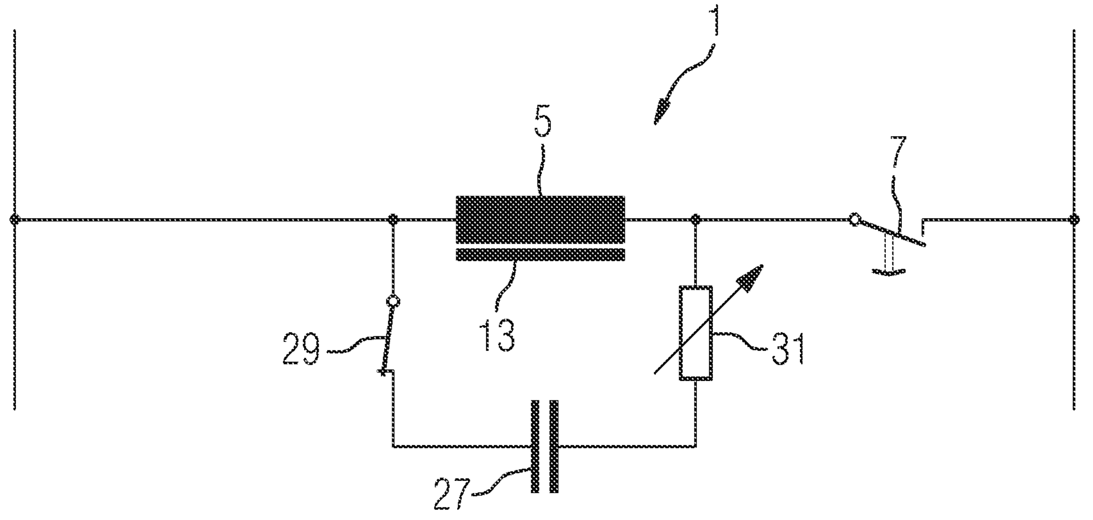
FIG. 9 shows a circuit diagram of a seventh exemplary embodiment of a tripping device.

FIG. 9 (FIG. 9) shows a circuit diagram of a seventh exemplary embodiment of a tripping device 1, according to the invention, for a circuit breaker. This exemplary embodiment only differs from the exemplary embodiment shown in FIG. 8 in that the electrical resistor 31 has a settable ohmic resistance. The charging time for charging the capacitor 27 after the tripping circuit has been closed, and therefore the increase in the tripping time of the tripping device 1, are settable in comparison with the case in which the capacitor 27 and the electrical resistor 31 are not connected to the tripping circuit, due to the ability of the ohmic resistance of the electrical resistor 31 to be set.

Figure 10:
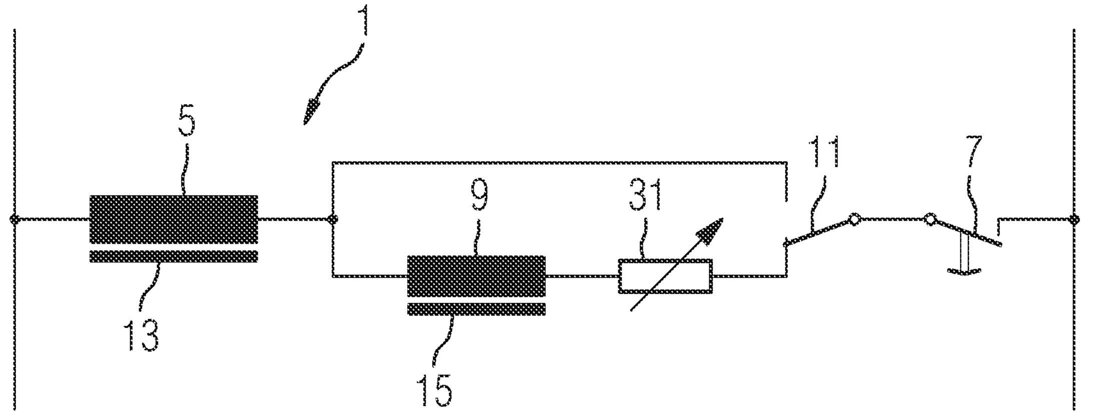
FIG. 10 shows a circuit diagram of an eighth exemplary embodiment of a tripping device.

FIG. 10 (FIG. 10) shows a circuit diagram of an eighth exemplary embodiment of a tripping device 1, according to the invention, for a circuit breaker. This exemplary embodiment only differs from the exemplary embodiment shown in FIGS. 1 and 2 in that a settable electrical resistor 31 is connected in series with the tripping coil 5.

The exemplary embodiments, shown in FIGS. 1 to 10, of a tripping device 1 according to the invention can be modified in various ways to form further exemplary embodiments. By way of example, the delay coil 9 and the second magnetic core 15 can be arranged outside of the housing 17 instead of inside of the housing 17 as in FIGS. 1 to 4. Accordingly, the capacitor 27, or the capacitor 27 and the electrical resistor 31, can be arranged outside of the housing 17 instead of inside of the housing 17 as in FIGS. 5 to 9. Furthermore, the second magnetic core 15 can be omitted in the exemplary embodiments shown in FIGS. 1 and 4 if the delay coil 9 has a sufficiently high inductance even without the second magnetic core 15. By way of example, the exemplary embodiment shown in FIG. 4 can also be modified in such a way that the delay coil 9 has an adjustable tap instead of a plurality of discrete taps 23 to 26. Moreover, the exemplary embodiments shown in FIGS. 3 and 4 can be combined with one another by virtue of both the second magnetic core 15 being configured so as to be displaceable and the number of turns of the delay coil 9, through which turns current flows, being configured so as to be settable. Analogously, the exemplary embodiments shown in FIGS. 7 and 8 or 9 can be combined with one another by virtue of the capacitor 27 having a settable capacitance and an electrical resistor 31, in particular having a settable ohmic resistance, additionally being able to be connected to the tripping circuit. Furthermore, analogously to the exemplary embodiment shown in FIG. 10, the exemplary embodiments shown in FIGS. 3 and 4 can be extended by an electrical resistor 31 that is connected in series with the delay coil 9. In addition, an exemplary embodiment shown in FIG. 1 to 4 or 10 can be combined with an exemplary embodiment shown in FIGS. 5 to 9 to form an exemplary embodiment that has both a delay coil 9 and a capacitor 27.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

The invention claimed is:

1. A tripping device for a circuit breaker, the tripping device comprising:

a tripping element;

a tripping circuit having a tripping coil being configured, upon being energized, to effect a movement of said tripping element; and at least one electrical delay element configured to be connected to said tripping circuit and reducing a steepness of a current increase of a current flowing in said tripping coil after said tripping circuit has been closed and/or delays the current increase of the current flowing in said tripping coil after said tripping circuit has been closed, wherein said at least one electrical delay element has a delay coil configured to be connected in series with said tripping coil, wherein an ohmic resistance of said delay coil is lower than an ohmic resistance of said tripping coil.

2. The tripping device according to claim 1, further comprising a magnetic core, around which a winding of said delay coil runs.

3. The tripping device according to claim 2, wherein said magnetic core is disposed so as to be displaceable with respect to said delay coil, with a result that an inductance of said delay coil is able to be changed.

4. The tripping device according to claim 1, wherein a number of turns of said delay coil, in said turns electric current flows when said tripping circuit is closed, is settable.

5. The tripping device according to claim 4, wherein said delay coil has a plurality of taps or an adjustable tap in order to set the number of turns.

6. The tripping device according to claim 1, further comprising an electrical resistor connectable in series with said tripping coil and said delay coil and functioning as a further delay element.

7. The tripping device according to claim 6, wherein said electrical resistor has a settable ohmic resistance.

8. The tripping device according to claim 1, further comprising a common housing, said tripping coil and said at least one electrical delay element are disposed in said common housing.

9. A circuit breaker, comprising:

a tripping device according to claim 1, said tripping device is configured to trigger a switching process of the circuit breaker.

10. A method for increasing a tripping time of a tripping device for a circuit breaker, the tripping device having a tripping element and a tripping circuit with a tripping coil being configured, upon being energized, to affect a movement of the tripping element, which comprises the step of:

connecting at least one electrical delay element to the tripping circuit for reducing a steepness of a current increase of a current flowing in the tripping coil after the tripping circuit has been closed and/or delays the current increase of the current flowing in the tripping coil after the tripping circuit has been closed, wherein said at least one electrical delay element has a delay coil configured to be connected in series with said tripping coil, wherein an ohmic resistance of said delay coil is lower than an ohmic resistance of said tripping coil.

* * * * *